No. 677,429. Patented July 2, 1901.
L. STURGES.
HUB.
(Application filed Sept. 30, 1899.)
(No Model.)
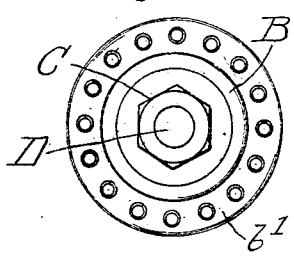
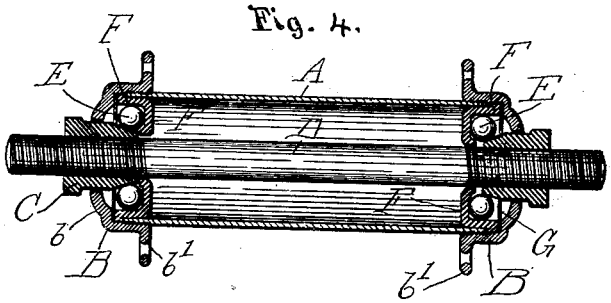
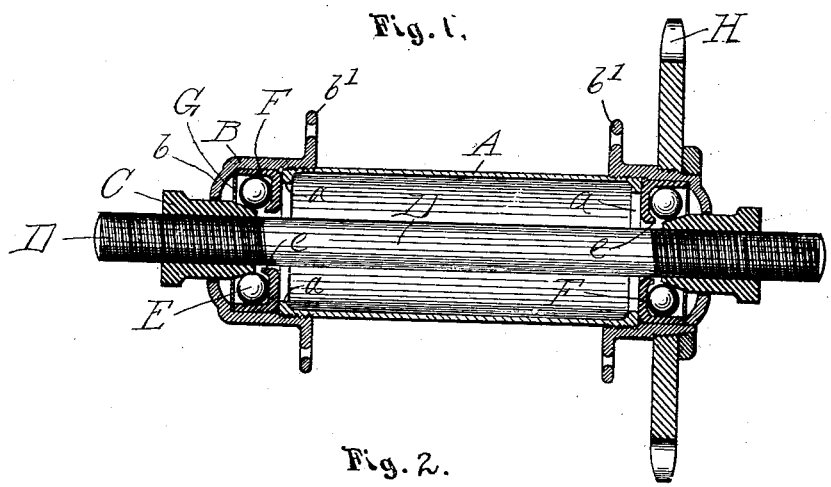
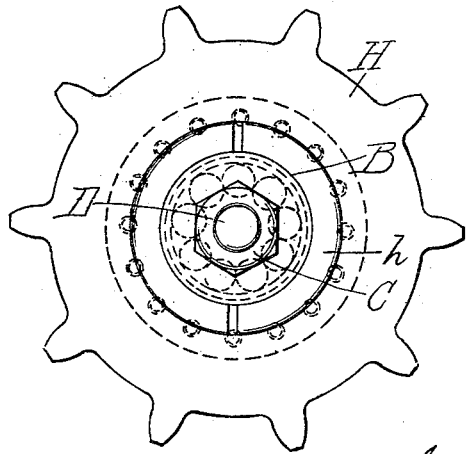
Witnesses:
G. S. Noble
M. E. Marsh
Inventor.
Lee Sturges
by Carter & Graves
Attorneys.
THE NORRIS PETERS CO., PHOTO-LITHO., WASHINGTON, D. C.

UNITED STATES PATENT OFFICE.

LEE STURGES, OF ELMHURST, ILLINOIS.

HUB.

SPECIFICATION forming part of Letters Patent No. 677,429, dated July 2, 1901.

Application filed September 30, 1899. Serial No. 732,149. (No model.)

*To all whom it may concern:*

Be it known that I, LEE STURGES, of Elmhurst, in the county of Dupage and State of Illinois, have invented certain new and useful Improvements in Hubs, of which the following is a specification.

This invention relates to improvements in hubs for bicycle-wheels and the like, and has for its object to provide a novel construction of extreme simplicity capable of being manufactured at low cost and at the same time affording an efficient and substantially dust-proof bearing meeting all the requirements of modern cycle construction.
The invention consists in the matters herein set forth, and particularly pointed out in the appended claims, and will be fully understood from the following detailed description when read in connection with the accompanying drawings, in which—

Figure 1 is an axial section of a hub embodying my invention and designed for the rear wheel of an ordinary rear-driving bicycle. Fig. 2 is an end view thereof. Fig. 3 is an end view of a similar hub suitable for a front wheel. Fig. 4 is an axial section of such front-wheel hub.

In said drawings, A designates the barrel of the hub, which is made of ordinary tubing, cut to the proper length and externally screw-threaded at its ends.

B B are end caps drawn or stamped from sheet metal and interiorly threaded to screw over the ends of the barrel A, the end walls or outer flanges *b* of these caps being centrally apertured to admit the cone C of the bearing, which they fit as closely as is practicable without actual contact. Said cones are herein shown as conveniently mounted upon the ends of the shaft D by being adjustably screw-threaded thereon in the usual manner, and the bearing-balls E are inserted between the inner ends of these cones and bearing-cups F, which are pressed into the caps before the latter are screwed upon the ends of the barrel, annular ball-retainers G, of thin brass or other suitable material, being inserted in the cap in advance of the cups and clamped between the two when the latter are pressed home. A slight inwardly-turned marginal lip or flange *e* is shown as formed around the annular opening in the cup, through which the shaft passes, and cooperates with its ball-retainer in holding the balls in place when the cones and shaft are removed from the hub.

In the rear-wheel hubs (shown in Figs. 1 and 2) the ends of the barrel A are flanged in slightly at *a* and trued off to afford a square bearing for the cups F, by which the latter are brought into exact alinement when the caps B are screwed in place. Perforated annular flanges *b'*, formed at the inner ends of the caps B, provide for the attachment of the spokes to the hub, and the sprocket wheel or pinion G is applied by screw-threading or otherwise suitably securing it upon the outer end of one of the caps H, the usual locking-collar *h* being desirably screwed on after it upon a thread of opposite pitch to clamp it tightly in place.

In the front-wheel hub shown in Fig. 4 the construction differs slightly in that the caps B are somewhat shorter than in the rear hub, the cups F being turned off for a distance from their inner ends to permit their entering the ends of the barrel A, as shown, a somewhat more compact and lighter construction being thus afforded and rendered possible by the smaller necessary dimensions of the parts and the absence of the sprocket-pinion on this hub.

The improved hub thus described is of substantially dust-proof construction, and by reason of its simplicity can be manufactured with the greatest ease and economy, as will be at once apparent to those skilled in the art.

I claim as my invention—

1. A vehicle-hub comprising a cylindric barrel of tubing, end caps screwed thereon having at opposite ends outwardly and inwardly extending integral flanges, and outwardly-facing bearing-cups clamped between the ends of the barrel and the inwardly-extending flanges at the outer ends of the caps.

2. A hub comprising a cylindric barrel of tubing, end caps screwed thereon each having at its inner end an outwardly-projecting integral flange and at the outer end an inwardly-projecting integral flange, an outwardly-facing bearing-cup located in each cap, and ball-retainers interposed between said cups and the outer flanges of the caps; said cups and ball-retainers being clamped between the ends of the barrel and the outer flanges of the caps.

In testimony that I claim the foregoing as my invention I affix my signature, in presence of two subscribing witnesses, this 13th day of September, A. D. 1899.

LEE STURGES.

Witnesses:
HENRY W. CARTER,
M. E. MARSH.